Aug. 3, 1937.    B. J. DENNISON    2,088,776
PROCESS OF MAKING LAMINATED SAFETY GLASS
Filed March 17, 1936
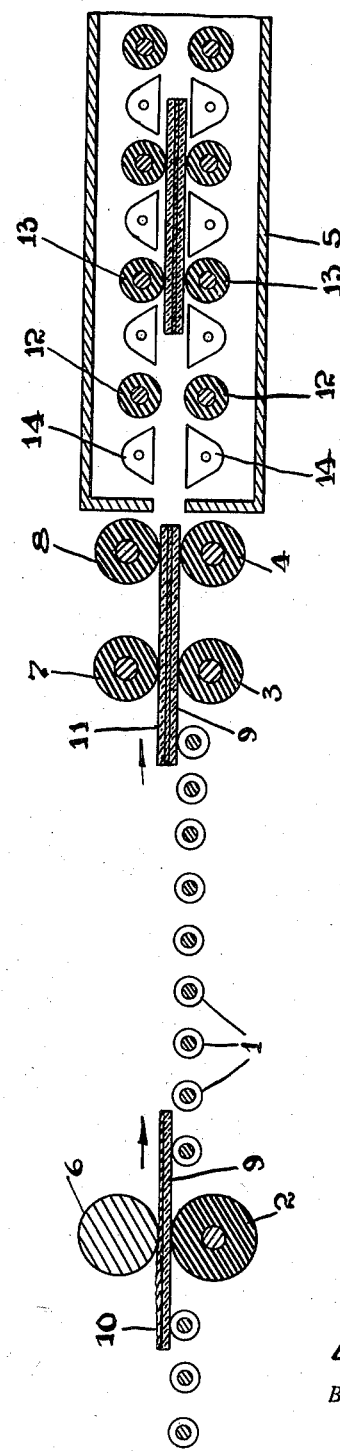
INVENTOR.
B.J. DENNISON
BY
ATTORNEYS.

Patented Aug. 3, 1937

2,088,776

UNITED STATES PATENT OFFICE 2,088,776

PROCESS OF MAKING LAMINATED SAFETY GLASS

Brook J. Dennison, New Kensington, Pa., assignor to Pittsburgh Plate Glass Company, Allegheny County, Pa., a corporation of Pennsylvania Application March 17, 1936, Serial No. 69,313

4 Claims. (Cl. 49—81)

The invention relates to a process of making safety glass and particularly to the fabrication of such glass when the interlayer consists of relatively soft plastic material, such as the plasticized synthetic resins. An example of such an interlayer is polymerized incomplete polyvinyl acetal resin having a plasticizer content (such as one of the phthalates) of from 25 to 45 per cent. Such interlayers are much softer than the cellulose nitrate and acetate plastic sheeting heretofore mainly employed as safety glass reinforcing, and when assembled with sheets of glass and pressed in the usual way show a relatively high percentage of defective product incident to the entrapping of bubbles of air between the glass and the resin interlayer. The object of the present invention is the provision of an improved procedure whereby the entrapping of air between the glass sheets and the interlayer is avoided. The method whereby this is accomplished is shown in the accompanying drawing, wherein:

The figure is a diagrammatic vertical section illustrating the apparatus employed and the steps of the process.

In the drawing, 1, 1, 1, etc. and 2, 3 and 4 are driven rolls constituting a runway leading into the roller press casing 5, the rolls 2, 3 and 4 having an outer sheathing of yielding material, such as rubber. In opposition to the rubber covered roll 2 is a steel presser roll 6, and in opposition to the rubber sheathed rolls 3 and 4 are other rubber sheathed presser rolls 7 and 8.

In carrying out the process, glass bottom sheets 9, each carrying a sheet of the soft resin interlayer 10, are fed along the runway from left to right and pass first between the rolls 2 and 6. In passing between these rolls, the resin layer is flattened out, as shown diagrammatically, and the air lying between the surfaces of the glass and resin is expelled to the rear. Due to the soft relatively plastic condition of the interlayer, it is made to contact with the glass throughout its area and adhere lightly thereto (due either to air pressure or a slight degree of tackiness in the resin), so that there is no back flow of air between the resin sheet and the glass after the assembly has passed the rolls 2 and 6.

The next step in the procedure is the application of the top sheet 11 of glass to the assembly before it reaches the rolls 3, 7. In passing between the rubber covered rolls 3, 7 and 8, 4, the top sheet 11 is progressively pressed down upon the resin sheet and any air between the glass and resin sheets is expelled to the rear, so that air pockets between the resin sheet and the top sheet of glass are removed. Since the resin sheet is smooth and flat when the top sheet of glass is applied, the amount of entrapped air is much less than that present between the resin sheet and the bottom sheet of glass before they pass the rolls 6, 2, but nevertheless, the step of pressing between the rolls 7, 3, and 8, 4 is an important factor in insuring freedom from entrapped air before the sheets are sealed together under heat and pressure.

The last step involved in adhering the sheets permanently together before final hydraulic pressing, is the passage of the assembly through the roller press consisting of the pairs of opposing driven rubber covered rolls 12, 12, 13, 13, etc., in the casing 5. Electric heaters 14, 14, etc., arranged above and below the line of travel of the assemblies, serve to soften the resin interlayer, so that it is made strongly adherent to the surfaces of the glass sheets. This roller press method of laminating the sheets is not an essential of the applicant's process, as the assemblies after passing the rolls 8, 4 may be removed from the runway and composited in platen presses, or in diaphragm presses, such as those shown in the Sherts Patent No. 1,906,821, dated May 2, 1933. The roller press method illustrated is preferred, however, because it involves less labor and there is less opportunity for the sheets to be shifted relatively, permitting a re-entry of air. After the assemblies emerge from the casing 5, the laminating operation is preferably completed by the hydraulic method set forth in the Sherts and Hamill Patent No. 1,781,084, dated November 11, 1930, the sandwiches being placed in an autoclave and exposed to a pressure of about 150 pounds per square inch and to a temperature of from 225 to 250 deg. F.

If the plastic is of uniform thickness, it is possible to obtain a satisfactory laminated product without the hydraulic pressing step as described above. The cooling of the plastic or both the glass and plastic preliminary to the passing of the sheets between the rolls 6, 2 and 7, 3 also helps in making a product which does not require the hydraulic pressing above set forth. If the plastic is not of uniform thickness, the final hydraulic pressing step is necessary in order to give a good product.

What I claim is:

1. A process of preparing a safety glass assembly for lamination, which consists in placing a soft pre-formed resin reinforcing sheet upon a glass sheet in matched relation therewith, progressively rolling the reinforcing sheet into contact with the glass sheet throughout its area, whereby the air is removed from between the sheets, placing a second sheet of glass on the resin sheet and subjecting the assembly to a progressive rolling action beginning at one end of the assembly and extending to the other end thereof, whereby the air is removed from between the second glass sheet and the resin sheet.

2. A process of preparing a safety glass assembly for lamination, which consists in placing a soft pre-formed resin reinforcing sheet upon a glass sheet in matched relation therewith, progressively rolling the reinforcing sheet into contact with the glass sheet throughout its area, whereby the air is removed from between the sheets, placing a second sheet of glass on the resin sheet and subjecting the assembly in the absence of heat to a progressive rolling action beginning at one end of the assembly and extending to the other end thereof whereby the air is removed from between the second glass sheet and the resin sheet.

3. A process of preparing a safety glass assembly for lamination, which consists in placing a soft pre-formed resin reinforcing sheet upon a glass sheet in matched relation therewith, progressively rolling the reinforcing sheet into contact with the glass sheet throughout its area, whereby the air is removed from between the sheets, placing a second sheet of glass on the resin sheet and subjecting the assembly, without increasing the temperature thereof, to a progressive rolling action beginning at one end of the assembly and extending to the other end thereof, and finally subjecting the assembly to a progressive rolling action while heat is applied thereto, thus causing the resin sheet to soften and become sticky, so that it adheres permanently to the glass sheets.

4. A process of preparing a safety glass assembly for lamination, which consists in placing a soft pre-formed resin reinforcing sheet upon a glass sheet in matched relation therewith, progressively rolling the reinforcing sheet into contact with the glass sheet throughout its area, whereby the air is removed from between the sheets and the resin sheet caused to stick lightly to the glass preventing the re-entry of air between the sheets after the rolling action, placing a second sheet of glass on the resin sheet and subjecting the assembly to a progressive rolling action beginning at one end of the assembly and extending to the other end thereof whereby the air is removed from between the second glass sheet and the resin sheet.

BROOK J. DENNISON.